(12) United States Patent
Monereau et al.

(10) Patent No.: US 6,451,090 B2
(45) Date of Patent: Sep. 17, 2002

(54) PERMEATION INSTALLATION

(75) Inventors: Christian Monereau; Serge Phelut, both of Paris (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 29 days.

(21) Appl. No.: 09/734,213

(22) Filed: Dec. 12, 2000

(30) Foreign Application Priority Data

Dec. 14, 1999 (FR) .............................................. 9915755

(51) Int. Cl.$^7$ .............................................. B01D 53/22
(52) U.S. Cl. ........................ 95/55; 95/45; 96/8; 96/9; 96/10
(58) Field of Search ............................ 95/8, 12, 14, 15, 95/18, 19, 22, 23, 45, 47–56; 96/4, 7–10

(56) References Cited

U.S. PATENT DOCUMENTS

| | | | |
|---|---|---|---|
| 4,352,736 A | * 10/1982 | Ukai et al. ............... | 96/9 X |
| 4,451,369 A | 5/1984 | Sekino et al. | |
| 4,670,145 A | 6/1987 | Edwards | |
| 4,874,405 A | * 10/1989 | Minhas ...................... | 96/9 |
| 5,071,552 A | * 12/1991 | Bikson et al. ............ | 210/321.8 |
| 5,470,469 A | * 11/1995 | Eckman ..................... | 96/7 X |
| 5,536,405 A | * 7/1996 | Myrna et al. ............. | 96/7 X |
| 5,554,283 A | * 9/1996 | Brinda et al. ............ | 96/8 X |
| 5,851,267 A | * 12/1998 | Schwartz .................. | 96/7 |

FOREIGN PATENT DOCUMENTS

| | | |
|---|---|---|
| EP | 0 331 067 | 9/1989 |
| EP | 0 492 045 A1 | 7/1992 |

* cited by examiner

*Primary Examiner*—Robert H. Spitzer
(74) *Attorney, Agent, or Firm*—Young & Thompson

(57) ABSTRACT

The invention relates to a permeation installation comprising:
- a single pressure resistant chamber (30),
- a plurality of permeation modules (34, 36) disposed within the chamber, each module being constituted by at least one permeator formed of hollow fibers with porous walls and being disposed within an envelope (38) provided with perforations placing in communication the external portion of each module and the common gaseous circuit,
- elements (32) to supply the installation with the gaseous mixture to be treated,
- elements (46) to recover the fraction of the gaseous mixture having passed through the wall of the fibers; and
- elements (44) to recover the fraction of the gaseous mixture that has not passed through the wall of the fibers.

19 Claims, 3 Drawing Sheets

PERMEATION INSTALLATION

FIELD OF THE INVENTION

The present invention relates to permeation installations.

BACKGROUND OF THE INVENTION

The technique or process of permeation permits the separation of a gas from a mixture of gases in gaseous phase with the help of porous walls. This technique consists in applying under a relatively high pressure of the order of several tens of bars, the gaseous mixture in the environment of a bundle of hollow fibers produced from polymer of a particular type. Under the influence of the pressure and because of the nature of the material, the molecules of a gas will be adsorbed selectively by the material constituting the hollow fibers, passing through the pores of these porous fibers and will be recovered by desorption within the channel of very small size existing in these fibers. On the other hand, the gas or gases corresponding to the other molecules will not pass or will very little pass through the porous wall and will remain outside the bundle of hollow porous fibers.

In certain embodiments, a so-called sweeping gas flow, of a different composition than the permeate, is introduced within the fibers, from the side opposite that for recovery of the permeate. This injection has for its object to increase the yield by recuperation of the gas preferentially passing through the fibers.

This embodiment somewhat complicates the technique of permeators and is not described in what follows. The invention can also be applied to this type of embodiment.

In the accompanying FIG. 1, there is schematically shown a permeator. It comprises an external chamber 10 resistant to pressure, within which is mounted a bundle 12 of hollow porous fibers. The gaseous mixture is introduced by the nozzle 14 disposed at the lower end of the chamber 10. The gas under pressure surrounds the bundle of hollow fibers. The fraction of the gas which passes through the hollow wall penetrates the channels of the fibers and is recovered at one end of these latter in a chamber 16, the latter being connected to an outlet conduit 18 for the fraction of the gaseous mixture having passed through the wall of the fibers and which will ultimately be called permeate and indicated by the letter P. On the other hand, the fraction of the gaseous mixture which did not pass through the wall of the fibers is recovered, preferably with a tube provided with perforations 20 which extends axially along the bundle of fibers 12. This fraction of the gaseous mixture leaves the chamber 10 by the nozzle 22 connected to the perforated tube 20. The fraction of the gaseous mixture that did not pass through the wall of the hollow fibers will ultimately be called non-permeate and indicated by the letter R.

In another embodiment, the gaseous mixture is introduced via the central tube 22 and the non-permeate is recovered in the chamber 20.

As already indicated, the pressure of the gaseous mixture is relatively high, typically in the order of several tens of bars. It is thus necessary that the external chamber 10 with resistance to pressure have a relatively great wall thickness and the different nozzles such as 18 and 22 passing through this wall must also be made precisely to maintain the resistance to pressure of the chamber 10.

It will be understood that it is thus interesting to have several permeators 12 within the same pressure resistant chamber 10. This has already been proposed, particularly in U.S. Pat. No. 4,874,405, which discloses a permeation module consisting of several individual permeators disposed one above the other, these permeators being disposed in a same pressure resistant chamber.

However, it appears that, for reasons both technical and economical, it is difficult to have more than three permeators one above the other within a same chamber. However, there exists a certain number of situations in which it is desired to be able to process volumes of gaseous mixture with relatively high flow rates which are not compatible with the use of three permeators disposed one above the other.

To solve this problem, it could be envisaged to arrange within a same pressure chamber (shown at 24 in the accompanying FIG. 1A), several permeation ensembles, such as 26, disposed one beside the others. In FIG. 1A, there is also shown the inlet nozzle 28 for the gaseous mixture to be treated in the pressure chamber 24. However, it is important in such an installation that each permeation module be supplied by a predetermined gaseous flow rate, departing from this flow rate gives rise to a very great decrease in the output of the installation. To solve this problem, there can be envisaged provision of different permeation modules 26 in a pressure resistant chamber 24 of large dimension, such that the flow rates for each permeation module will be substantially the same. It will be understood, however, that such a solution is unacceptable because it leads to a very great increase in the cost of the installation because of the large dimensions of the pressure resistant chamber 24 and hence in particular the increase of the wall thickness of this chamber.

SUMMARY OF THE INVENTION

An object of the present invention is to provide a permeation chamber in which several permeators or several permeation modules are disposed one beside the other within a single pressure resistant chamber whose dimension is reduced whilst permitting an overall higher output from this installation.

To achieve this object, according to the invention, the permeation installation comprises:
  a single pressure resistant chamber,
  at least two permeation modules disposed within said chamber, each module being constituted by at least one permeator formed of hollow fibers with a porous wall and being disposed within an envelope provided with perforations placing in communication the external portion of each module and the common gaseous circuit,
  means to supply said installation with a gaseous mixture to be processed,
  means to recover the fraction of the gaseous mixture that has passed through the wall of said fibers;
  means to recover the fraction of the gaseous mixture that has not passed through the wall of said fibers.

It will be understood that, thanks to the interposition of the perforated envelopes constituting pressure drops in the common gaseous circuit, the modules are supplied with substantially equal flow rates for the different modules and with a good distribution of the flows for each module, thereby permitting the optimum operation of each permeation module and accordingly the optimum operation of the unit. It will be moreover understood that the perforated envelopes are disposed at the interface of two gaseous media whose pressures are not very different. These envelopes can therefore have a relatively simple mechanical construction.

According to a first embodiment, the perforators are interposed in the supply circuit of the gaseous mixture to the permeation modules. According to a second embodiment, the perforations are interposed in the recovery circuit of the fraction of the gaseous mixture that has not passed through the walls of the fibers of the permeators (non-permeate).

It will be understood that, in these two cases, the pressure drop which results permits substantially equalizing the gaseous flow rate in all the permeation modules.

According to a first embodiment of the installation, each permeation module has a generally cylindrical shape, each envelope has a cylindrical shape surrounding said permeation module over all its axial length and said cylindrical envelope is perforated in its lateral portion and is closed at each of its ends by a closed wall.

According to a second embodiment of the invention, each permeation module has a generally cylindrical shape, each permeation module is surrounded over all its length by an imperforate cylindrical wall and an imperforate plate closes one end of the imperforate cylindrical wall, another end plate having said perforations.

Preferably, the pressure drop created by said perforations is comprised between 10 and 90% of the total pressure drop between the inlet of the installation and the outlet for the fraction of the gaseous mixture that has not passed through the wall of the fibers, and preferably between 15 and 60%.

BRIEF DESCRIPTION OF THE DRAWINGS

Another characteristics and advantages of the invention will become better apparent from a reading of the description which follows, of several embodiments of the invention, given by way of non-limiting example. The description refers to the accompanying figures, in which:

FIG. 6A is a cross-sectional view on the line A—A of FIG. 6;

DESCRIPTION OF THE PREFERRED EMBODIMENTS

Figure 3:
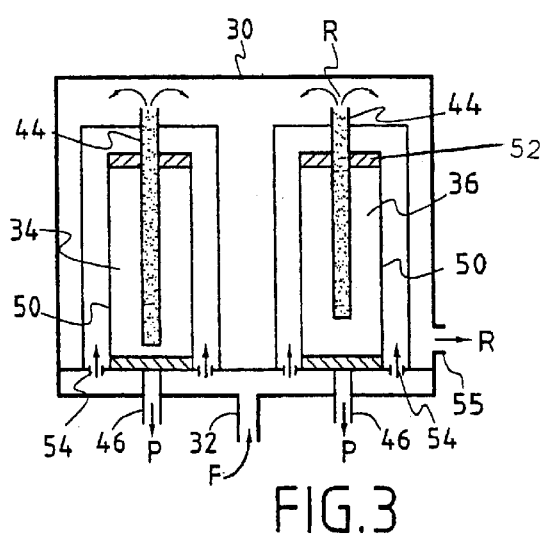
FIG. 3 shows in simplified manner a second embodiment of the permeation installation.
Figure 4:
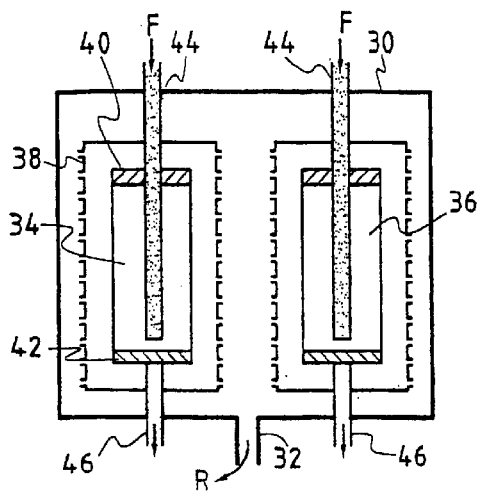
FIG. 4 shows in simplified manner a third embodiment of the permeation installation.
Figure 5:
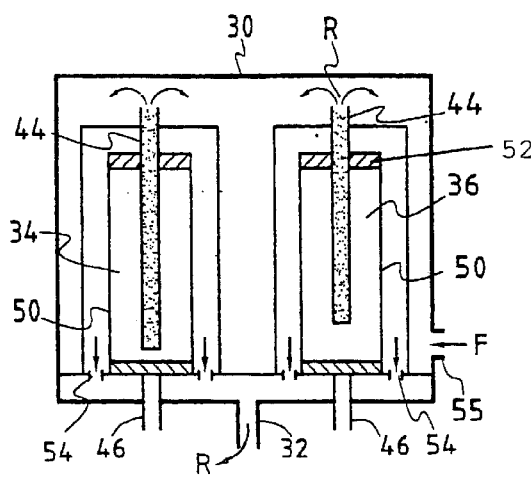
FIG. 5 shows in simplified manner a fourth embodiment of the permeation installation.

A permeation installation according to the invention an belong to four different types, on the one hand, according to whether the envelope is perforated in its lateral portion (FIGS. 2 and 4) or at one of its ends (FIGS. 3 and 5) and on the other hand, according to the position of the perforated envelopes relative to the different gas flows, the perforated envelope being interposed within the gaseous mixture to be treated (FIGS. 2 and 3) or in the flow of non-permeate (FIGS. 4 and 5).

Figure 1:
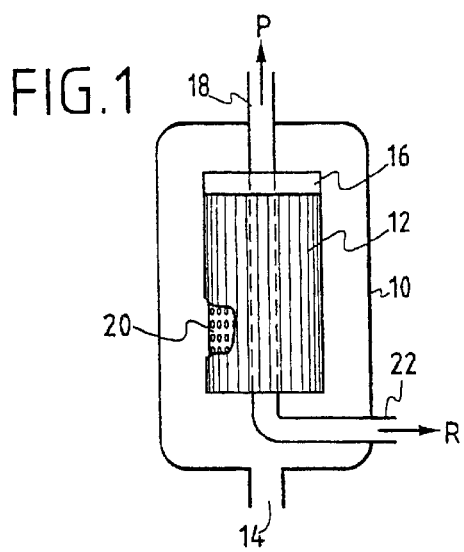
FIG. 1, already described, shows schematically a permeator of the prior art.
Figure 1A:
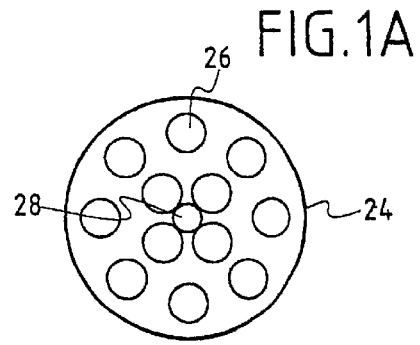
FIG. 1A, already described, shows in simplified fashion a permeator that can be used with several permeation modules disposed side by side.
Figure 2:
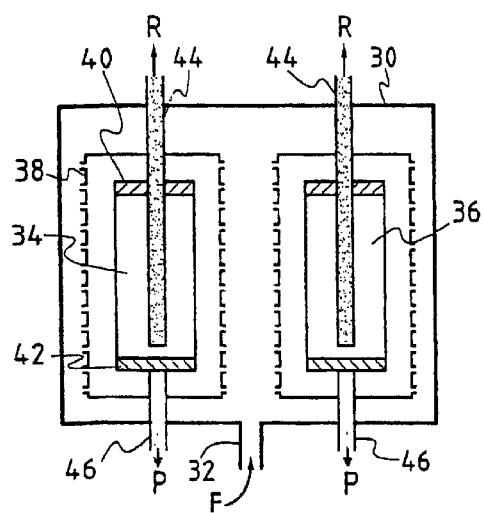
FIG. 2 is a simplified view of a first embodiment of a permeation installation according to the invention.

Referring first to FIG. 2, there will be described a first embodiment of the permeation installation. In this simplified figure, there is shown the pressure resistant chamber 30 provided with its nozzle 32 for the introduction of the gaseous mixture F. In each figure, there is also shown two permeators 34 and 36 which could also be permeation modules constituted by several permeators mounted one above the other. Each permeation module 34, 36 is disposed within an envelope constituted by a cylindrical wall 38 which extends over all the height of the permeation module and which is closed at its ends by two plates 40 and 42. The sidewall 38 is perforated, with perforations of calibrated diameters, whilst the plates 40 and 42 are imperforate. In a schematic manner, there is also shown tubing 44 for the recovery of the non-permeate R and the tubing 46 for recovery of the permeate P recovered within the hollow fibers constituting the permeators 34, 36.

It will be understood that thanks to the pressure drop resulting from the perforations 38, the different permeators or permeation modules 34, 36 can be supplied with a same perfectly defined flow rate no matter what the pressure drop of the different paths from the introduction nozzle of the gaseous mixture 32 to the permeators 34, 36. It will also be understood that the pressure within the envelope constituted by the lateral walls 38 and the end plates 40 and 42 is only a little less than the pressure of the gaseous mixture in the chamber 30 within the envelopes 38. These envelopes 38 can thus have a reduced thickness and very much less than the thickness of the external chamber 30.

FIG. 3 shows in a simplified manner a second embodiment of the permeation installation. The latter again comprises the external pressure chamber 30 with its nozzle 32 for introduction of the gaseous mixture to be treated under pressure. There are seen the permeators or permeation modules 34 and 36. These latter are disposed in individual envelopes constituted by a cylindrical wall 50 extending over all the height of the permeation module, this wall 50 being imperforate. A first end of the lateral 50 is closed by an imperforate plate 52, whilst its second end is closed by a plate 54 provided with perforations of calibrated dimensions. The same is true for all the permeators or permeation modules contained within the chamber. It will be understood that, as in the first embodiment, the perforated plates 54 divided the entering flow and impose pressure drops which can be adjusted with high precision to obtain for each permeation module a same flow rate corresponding to the optimum operation of the permeation module. As in the case of the first embodiment, the envelopes 50, 52, 54 can be made with a relatively less thickness, because the pressure on their two surfaces is substantially the same. The non-permeate R is recovered by the tubes 44 and leaves the chamber 30 by the nozzle 55.

In the embodiment shown in FIG. 4, the installation has the same structure as that of FIG. 2. The difference resides in the circulation of the different gas flows. The gaseous mixture F to be treated is introduced into the permeators through the interior tubes 44, whilst the non-permeate R is recovered through the outlet nozzle 32 of envelope 30. The perforated envelope (38, 40, 42) is disposed in the flow R of non-permeate leaving the permeators.

According to the embodiment of FIG. 5, the installation has the same structure as that of FIG. 3. Only the circulation of the different gas flows is modified. The gaseous mixture F to be treated is introduced into the chamber through the nozzle 55 and the non-permeate R is recovered through the nozzle 32 after having passed through the perforations of the plates 54.

It follows that the number of permeators or of permeation modules is typically greater than 2, as is shown in simplified manner in FIGS. 2 to 5. This number can be equal to 3, 5 or 7, which permits optimum filling of the interior of the chamber 30.

It will be understood that no matter what the embodiment in question, the pressure drop created by each perforated envelope interposed between the introduction nozzle for the mixture into the chamber and each permeation module, or between each permeator and the recovery nozzle of the non-permeate, permits defining very precisely the circulatory flow rate through each permeation module. It will also be understood that this pressure drop can be defined in such a manner as to be very much greater than the pressure drop resulting from the normal circulation of the gaseous mixture within the pressure resistant chamber and at the exterior of the envelope surrounding each permeation module. There can also be a certain number of permeation modules beside each other in a pressure resistant chamber of reduced dimensions. It will also be understood that the pressure on opposite sides of the perforated plates is relatively identical and that the plates can therefore be made of sheet metal of a thickness that is also relatively reduced.

Preferably, the pressure drop created by the perforated envelopes is comprised between 10 and 90% of the total pressure drop between the inlet of the installation and the non-permeate outlet. Preferably, this pressure drop is comprised between 15 and 60%.

It can also be indicated that, preferably, the total surface of the perforations represents from 0.1 to 3 times the cross-section of the supply nozzle for gaseous mixture (FIGS. 2 and 3) or this same proportion of the cross-section of the outlet nozzle for the non-permeate (FIGS. 4 and 5). Again preferably, these ranges are comprised between 0.5 and 2 times the cross-sectional area of the nozzle.

The perforations can also be predetermined by the perforation that their total surface represents relative to the total surface of the perforated envelope. This proportion is preferably below 10% and again preferably below 1%.

Figure 6:
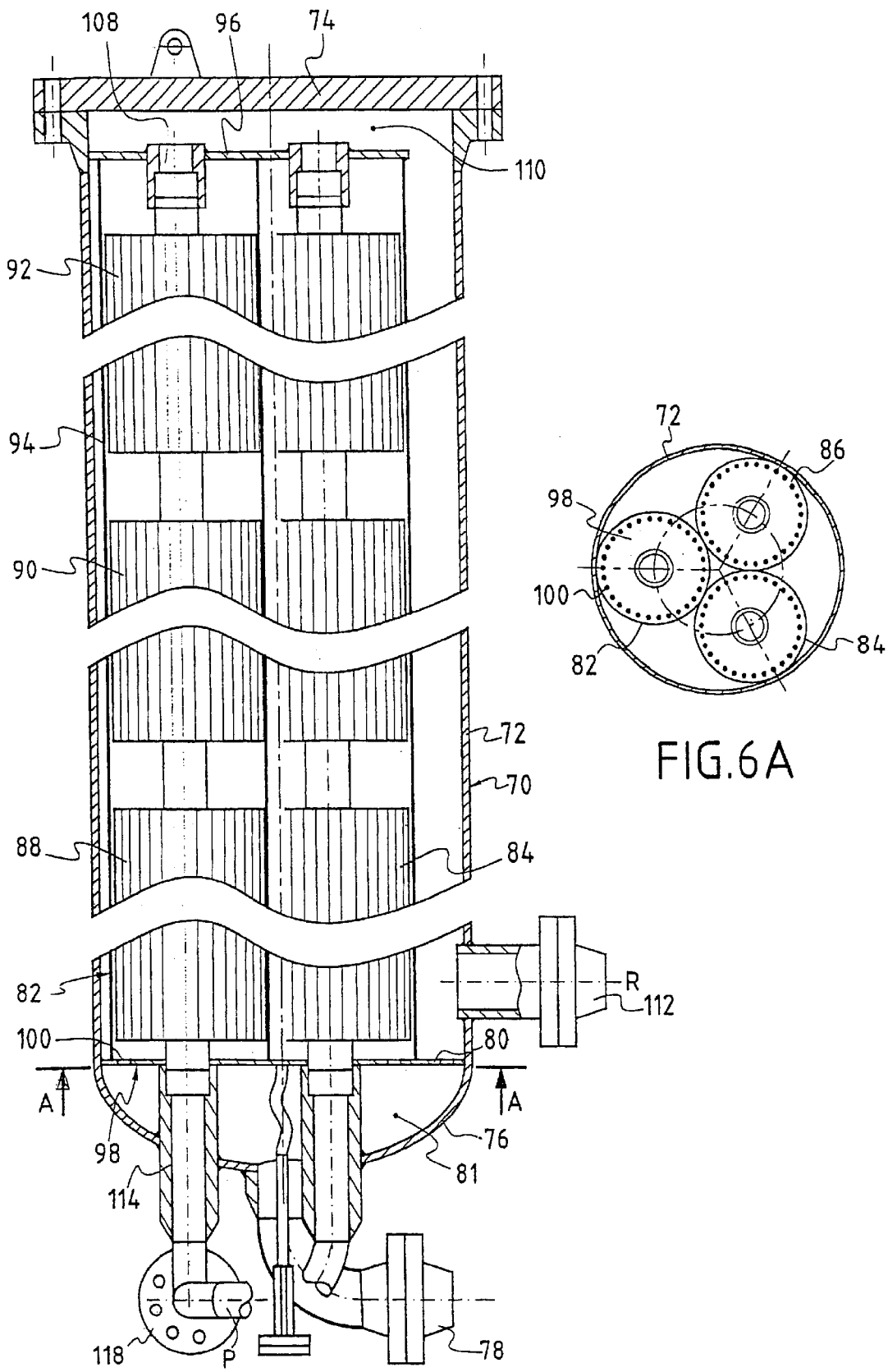
FIG. 6 shows in vertical cross-section a detailed example of embodiment of the permeation installation according to the embodiments of FIG. 3.
Figure 7:
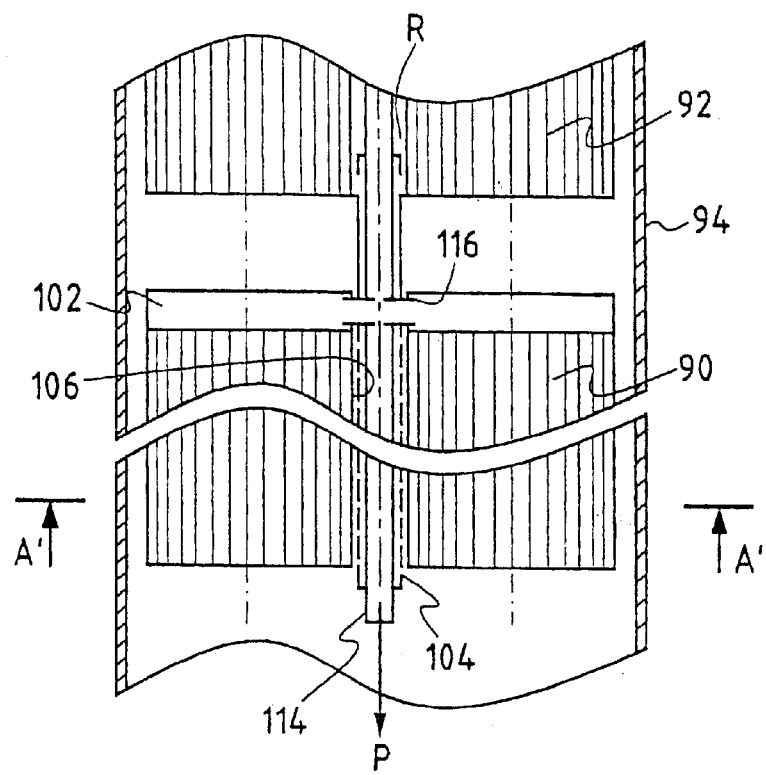
FIG. 7 is a fragmentary view of FIG. 6 showing the recovery of the permeate and of the non-permeate in a permeation module.

Referring now to FIGS. 6 and 7, there will be described in greater detail a preferred embodiment of the permeation installation according to the principle shown in FIG. 3.

In FIG. 6, there is shown the external pressure resistant chamber 70 of the permeation installation which is constituted by a cylindrical sidewall 72, by a bolted cover 74 and by a semispherical end cap 76.

The bottom 76 of the pressure chamber is provided with a nozzle 78 for the introduction of the gaseous mixture to be processed. The lower portion of the chamber is separated from the rest of the latter by a plate 80 which thereby defines, at the lower end of the chamber, a single supply chamber 81. In this figure, there are also shown two permeation modules 82 and 84, the cross-sectional view of FIG. 6A showing that the installation in fact comprises a third permeation module 86. Each permeation module comprises three unitary permeators generally indicated at 88, 90 and 92, disposed in series one above the other. Each permeation module is surrounded over all its length by a cylindrical envelope 94 whose upper end is closed by a plate 96 and whose lower end is closed by a lower perforated plate 98 which is connected in sealed fashion to the plate 80 or which is integral with it. Thus, the perforations such as 100 in the perforated plates 98 open directly into the supply chamber 81 and thereby permit creating a pressure drop between the introduction nozzle 78 and each permeation module 82, 84 and 86. As better shown in FIG. 6A, the perforations are preferably disposed on a same circle relative to the longitudinal axis of the permeation modules, thereby permitting providing a homogeneous circulation over all the periphery of the module.

Figure 7A:
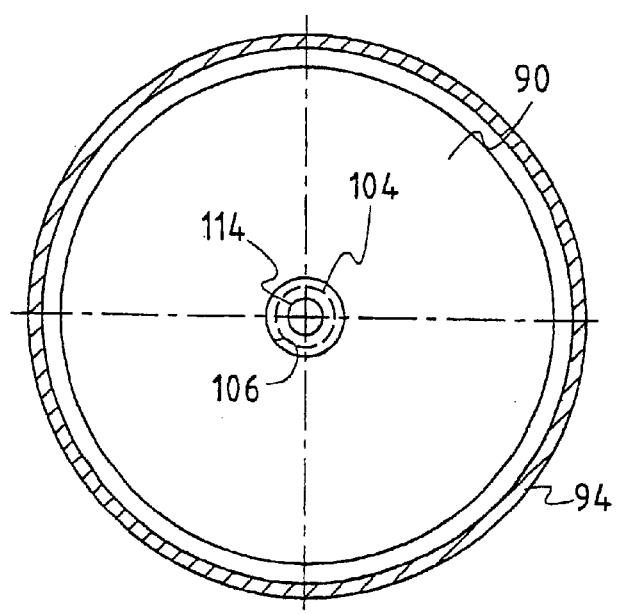
FIG. 7A is a cross-sectional view on the line A—A of FIG. 7.

The recovery of the permeate P and of the non-permeate R will be better understood with reference to FIGS. 7 and 7A, in which there is shown a portion of a permeation module. More precisely, in FIG. 7, there is shown for example the permeator 90 and the permeator 92 of the permeation module 82. There is also shown the envelope 94. At the upper end of the bundle of hollow fibers constituting the permeator 90, is seen an annular chamber 102 for recovery of the permeate within the hollow fibers. The recovery of the non-permeate is carried out through a perforated tube 104 which is disposed in an axial passage 106 of each permeator. The perforated tube thus permits recovering the non-permeate which arrives at the upper end 108 of the perforated tube 104 above the plates 96 closing the envelopes 94 surrounding each permeation module. The non-permeate thus arrives in the upper space 110 of the external chamber and redescends into the vertical spaces limited on the one hand by the cylindrical sidewall 72 of the external chamber, and on the other hand by the envelopes 94 of the permeation modules. The non-permeate R is recovered through the outlet nozzle 112 disposed at the lower end of the cylindrical sidewall 72 above the plate 80.

It will be understood that thanks to this arrangement, the assembly of the permeation modules is surrounded by a circulation of gas corresponding to the non-permeate which is also located along the external wall of the permeation installation. This circulation permits maintaining a very homogeneous temperature during operation of the modules by preventing any contact between the gas to be treated and the external medium, generally at a substantially lower temperature, thereby to obtain optimum performance.

Returning to FIG. 7, it will be seen that the recovery of the permeate is carried out through an axial tube 114 introduced into the perforated tube 104. At the level of each chamber 102 for recovery of the permeate, tubing 116 connects the tube 114 to the chambers 102. The upper end of the tube 114 is closed whilst its lower end passes through the bulbous portion 76 of the external envelope to be connected to nozzles 118.

The permeation installations according to the invention can have numerous applications, particularly the purification of hydrogen.

The permeate is thus the hydrogen of which it is desired that the purity be above 80% in total moles of permeate, preferably greater than 85%. The installation operates at a temperature comprised between 40 and 120° C.

Another installation consists in obtaining a mixture of predetermined composition, of hydrogen and a gas selected from CO, $N_2$, Ar, $CO_2$ and He. In this case, the mixture is the non-permeate R. The installation operates at a temperature comprised between 60 and 90° C.

What is claimed is:

1. A permeation installation comprising:
    a single pressure resistant chamber,
    at least two permeation modules disposed within said chamber, each module being constituted by at least one permeator formed of hollow fibers with porous walls and being disposed within an envelope provided with perforations placing in communication the external portion of each module and a common gaseous circuit, means for supplying said installation with a gaseous mixture to be treated, means for recovering the fraction of the gaseous mixture having passed through the wall of said fibers; and means for recovering the fraction of the gaseous mixture that has not passed through the wall of said fibers.

2. The permeation installation according to claim 1, wherein said common gaseous circuit is the circuit of gas to be treated.

3. The permeation installation according to claim 1, wherein said common circuit is that of the fraction of the gaseous mixture that has not passed through the wall of said fibers.

4. The permeation installation according to claim 1, wherein said perforations create substantially equal pressure drops between said common gaseous circuit and each permeation module.

5. The permeation installation according to claim 1, wherein the pressure drop created by said perforations is comprised between 10 and 90% of the total pressure drop between a gaseous mixture inlet of the installation and the outlet of the fraction of the gaseous mixture that has not passed through the wall of the fibers.

6. The permeation installation according to claim 5, wherein the pressure drop created by said perforations is comprised between 15 and 60%.

7. The permeation installation according to claim 5, wherein that:

said pressure resistant chamber is substantially cylindrical with a vertical axis, said gaseous mixture inlet is disposed at the lower end of the pressure resistant chamber, the lower portion of the interior of the pressure chamber being separated by a horizontal partition from the rest of the interior of the chamber to form a chamber into which opens said gaseous mixture inlet, perforated plates being disposed at the lower end of said permeation modules and being connected in a sealed manner to said partition through which said perforations of said perforated plates open into said chamber, and each permeation module is surrounded by an imperforate substantially cylindrical wall whose lower end is connected in a sealed manner to one of said perforated plates and whose upper end is closed.

8. The permeation installation according to claim 7, wherein said means for recovering the fraction of the gaseous mixture that has not passed through the walls of said fibers, comprise a plurality of perforated tubes disposed along the axis of each of the permeation modules and extending over all the length of said modules, the lower end of each perforated tube being closed, the upper end of each perforated tube passing through the upper closed end of one of the imperforate substantially cylindrical walls, and an outlet nozzle for said fraction of the gaseous mixture that has not passed through the wall of said fibers, said nozzle being disposed in the single end above the partition limiting said chamber, through which said fraction of the gaseous mixture that has not passed through the wall of the fibers circulates in the space delimited by said single pressure chamber and said imperforate substantially cylindrical walls, from the upper end of said chamber to said outlet nozzle disposed adjacent the lower end of the chamber.

9. The permeation installation according to claim 1, wherein each permeation module has a generally cylindrical shape, each envelope has a cylindrical shape surrounding said permeation module over all its axial length, and said cylindrical envelope is perforated in its lateral portion and is closed at each of its ends by a closed wall.

10. The permeation installation according to claim 1, wherein each permeation module has a generally cylindrical shape, each permeation module is surrounded over all its length by an imperforate cylindrical wall, and an imperforate plate closes one end of the imperforate cylindrical wall, another end plate having said perforations.

11. The permeation installation according to claim 1, wherein each permeation module comprises a plurality of permeators of generally cylindrical shape disposed vertically one above the other along their common axis, said permeators being supplied in parallel from said perforated envelope.

12. The permeation installation according to claim 1, wherein the total surface of the envelopes represents from 0.1 to 3 times the cross-section of a supply nozzle of the installation with gas to be treated.

13. The permeation installation according to claim 12, wherein the total surface of the envelopes represents from 0.5 to 2 times the cross-section of said supply nozzle.

14. The permeation installation according to claim 1, wherein the total surface of the perforations of the envelopes is 0.1 to 3 times the cross-section of an outlet nozzle for the fraction of the gaseous mixture that has not passed through the wall of said fibers.

15. The permeation installation according to claim 14, wherein the total surface of the perforations of the envelopes is 0.5 to 2 times the cross-section of said outlet nozzle.

16. The permeation installation according to claim 1, wherein the total surface of the permeations of an envelope is below 10% of the total surface of the perforated envelope.

17. The permeation installation according to claim 16, wherein the total surface of the permeations of an envelope is below 1% of the total surface of the perforated envelope.

18. A process for production of hydrogen having a purity greater than 80 mole percent, comprising introducing a gaseous mixture into an installation according to claim 1, the hydrogen being the fraction of the gaseous mixture which passes through the wall of said fibers.

19. A process for producing a final gaseous mixture $H_2+A$, A being selected from the group consisting of CO, $N_2$, Ar, $CO_2$ and He, comprising introducing an initial gaseous mixture into an installation according to claim 1, said final gaseous mixture being the fraction of the initial gaseous mixture that does not pass through the wall of said fibers.

* * * * *